United States Patent [19]

Ford et al.

[11] 3,978,261

[45] Aug. 31, 1976

[54] ELASTOMERIC PARTICLES HAVING POLYMERIZABLE SURFACE LAYER

[75] Inventors: David Norman Ford, East Doncaster; Howard William Tankey, Box Hill North, both of Australia

[73] Assignee: ICI Australia Limited, Melbourne, Australia

[22] Filed: Apr. 1, 1974

[21] Appl. No.: 456,980

[30] Foreign Application Priority Data

Apr. 6, 1973 Australia............................. 2919/73

[52] U.S. Cl............................. 428/212; 260/37 N; 260/40 R; 260/42.14; 260/42.16; 260/42.53; 428/323; 428/327; 428/328; 428/329; 428/403; 428/407; 428/414; 428/424; 428/474; 428/480; 428/522

[51] Int. Cl.²...................... B32B 7/02; B32B 5/16; B32B 19/02

[58] Field of Search................. 161/168; 260/42.53, 260/42.14, 42.16, 37 N, 40 R; 428/407, 403, 212, 323, 327, 328, 329, 306, 424, 414, 474, 480, 522; 106/299, 304

[56] References Cited
UNITED STATES PATENTS

| | | | |
|---|---|---|---|
| 2,780,612 | 2/1957 | Grotenhuis | 260/42.53 |
| 2,931,782 | 4/1960 | Jarrett | 161/168 |
| 3,272,772 | 9/1966 | Russell | 260/42.53 |
| 3,471,439 | 10/1969 | Bixler | 260/42.53 |
| 3,519,593 | 7/1970 | Bolger | 260/42.53 |
| 3,544,500 | 12/1970 | Osmond | 260/42.53 |

*Primary Examiner*—William J. Van Balen
*Assistant Examiner*—Ellis P. Robinson
*Attorney, Agent, or Firm*—Cushman, Darby & Cushman

[57] ABSTRACT

A heterogeneous elastomeric particle comprising a substantially inert elastomeric core surrounded by a surface layer capable of forming free radicals wherein the surface layer is covalently bonded to the elastomeric core and wherein the inert elastomeric core contains a finely divided inert solid.

12 Claims, No Drawings

ELASTOMERIC PARTICLES HAVING POLYMERIZABLE SURFACE LAYER

This invention relates to elastomeric particles.

Many of the polymeric materials used as mouldings or as film-forming components are inherently hard, with a glass transition temperature well in excess of ambient temperature, which are desirable features when related to their end uses. However, they also tend to be relatively inflexible and deficient in other mechanical properties such as toughness and their utility is limited accordingly.

Various proposals have been made to strike a more acceptable balance between these conflicting characteristics by, for example, blending the polymers with plasticisers or by embedding within a matrix of the principle polymer a second elastomeric polymer in the form of small discrete particles thereof. The use of polymer plasticisers is well-known and widely used but is not a universally acceptable technique for various reasons; for example, the amount of plasticizer required to impart a desired degree of flexibility frequently carries the penalty of unduly softening the polymer. The proposal to incorporate discrete elastomeric particles within the polymer matrix has met with a degree of success in that properties such as, for example, impact resistance, elongation to break, can be increased without significantly reducing desirable properties such as surface hardness and gloss.

It would appear that one source of the disappointing results associated with the use of some discrete elastomeric particles is their tendency, whilst under stress, to separate from the matrix polymer at the interface between the two polymers. This is not surprising since the two polymers, by their nature, have inherently different chemical and physical properties and hence usually little affinity for each other. Some up-grading of performance can be achieved by careful selection, based on the known characteristics of polymers, of the matrix and disperse polymer to achieve a better tolerance between them.

It has been found that the incorporation of unmodified elastomeric particles usually markedly deteriorates the physical properties of the glassy matrix polymer.

It has been proposed that some surface modification of the particles or some polymer active at the particle-matrix interface is required to obtain the required reinforcement of glassy matrix polymers.

Therefore, in the past, homogeneous elastomeric particles having reactive sites have been surface modified.

The known methods for grafting polymeric materials onto elastomeric particles mostly involve the free radical addition polymerisation of a monomer in the presence of unsaturated elastomeric particles, for example, polybutadiene. In this case, polymerisation may occur throughout the particle with a consequent change in the physical properties of the elastomer. Alternatively, the grafting polymerisation may be confined to the surface of the particles if, for example, a water soluble free radical initiator is used in conjunction with polybutadiene dispersed in water.

These methods depend on starting with unsaturated elastomeric particles to achieve reasonable grafting levels of the modifying polymer onto the particle. These unsaturated elastomers can be a disadvantage where, for example, good resistance to ultraviolet radiation is required.

We have now found a novel heterogeneous elastomeric particle which may be surface modified without suffering from the disadvantages of either bulk grafting or of residual unsaturation.

Accordingly we provide a heterogeneous elastomer particle comprising a substantially inert elastomeric core surrounded by a surface layer capable of forming free radicals wherein the surface layer is covalently bonded to the elastomeric core and wherein the inert elastomeric core contains finely divided titanium oxides or iron oxides.

The titanium oxide or iron oxide is preferably in the size range from .01 to 1 micron, more preferably in the range from 0.05 to 0.5 microns. The elastomeric particles have improved properties when the w/w percent of pigment in the elastomeric core is in the range from 0.1% to 50%, preferably 1% to 30%.

By 'substantially inert' we mean an elastomer core which will not readily generate free radicals under the conditions in which the surface layer readily forms free radicals, and which will not swell to any great extent in the conventional solvents in which elastomeric particles are dispersed. The conventional solvents are well known to those skilled in the art, and include aromatic solvents such as toluene and xylene, aliphatic ketones, esters such as ethyl acetate, butyl acetate, ethoxyethyl acetate, aliphatic alcohols, and also less polar solvents of the aliphatic hydrocarbon type. Preferably the inert core will absorb less solvent than 150% w/w of the core, most preferably less than 75% w/w.

In one embodiment of our invention the inert elastomeric core is covalently bonded to an intermediate layer which is not itself capable of forming free radicals under the influence of free radical initiators but contains groups which themselves may be converted into groups capable of forming free radicals.

In general, an elastomeric core is a polymer whose primary glass transition temperature ($T_g$), i.e. the $T_g$ of the dominant amorphous zones, is below the lowest ambient temperature to which the polymeric composition is likely to be subjected, say $-10°C$. The $T_g$ of the rubbery polymer, as it exists in the composition, may be determined by conventional methods such as dilatometry or differential thermal analysis, but it is important to make proper allowance for the well-known fact that the glass-rubber transition is rate-dependent, and it is better to measure the transition temperature at the highest rate of mechanical deformation that is likely to be encountered by the composition under practical conditions of use. For example, in the case where the composition may be struck by flying stones, the transition temperature can be deduced from measurements of the dynamic elastic modulus of the composition over a suitable range of temperatures at a frequency of 1000 Hz.

In general, the rubbery polymer should have a large extension to break and should be of high elasticity; preferably, in relation to the matrix polymer its modulus of elasticity should be at least an order of magnitude less than that of the matrix and its extension to break should be at least an order of magnitude greater than that of the matrix polymer.

The above considerations for the elastomer refer to its properties in its final form in the matrix polymer so that if, for example, plasticizer is present and at least some of the plasticizer resides in the elastomer, then it is the plasticized elastomer which should meet the above considerations.

The elastomeric core may be, for example, any of the commonly known types. As examples of condensation polymers, polyester, polyurethane, polyamide and epoxy elastomeric polymers prepared by dispersion polymerization techniques, are suitable. Elastomeric addition (co)polymers such as acrylates and methacrylates with low glass transition temperatures, for example, ethyl acrylate, n-propyl acrylate, beta-ethoxyethyl methacrylate, 2-ethylhexyl acrylate, octadecyl methacrylate may be used either alone or preferably with a monomer difunctional with respect to the polymerisation reaction, for example ethyleneglycol dimethacrylate, to impart a controlled degree of crosslinking.

The degree of crosslinking is important as two little crosslinking gives elastomeric cores which are not inert as they have high solvent - swelling characteristics. Too much crosslinking will give a core having a Tg above ambient temperature. For any polymer system, the correct degree of crosslinking can be found by simple experiment by methods well known to those skilled in the art.

Thus, for example, in the preparation of a polyester inert elastomeric core the relative proportions of dicarboxylic acid, triol and diol in the inert polyester core are not narrowly critical except that sufficient triol must be present to crosslink the polyester to prevent excessive swelling in solvent as herein before described and the amount of triol must not be so great that the core loses its elastomeric properties. We have found that satisfactory inert polyester cores may be prepared when the molar ratio of glycerol to adipic acid is in the range from 66:100 to 24:100 and enough diethyleneglycol is used to give a moderate excess over that required to react with the adipic acid not required for reaction with the triol.

The surface layer of the core may be formed from any organic compound which is capable of being coreacted with the elastomer and which contains a group either capable of taking part in a free radical polymerisation process or capable of being converted into such a group by reaction with an appropriate compound.

We also provide a process for preparing the heterogeneous elastomeric particles of our invention, said process comprising a modified dispersion polymerisation technique wherein a suspension of core particles is prepared by the conventional dispersion polymerisation of a first mixture of a monomer or monomers together with the finely divided iron oxide or titanium oxide and wherein said suspension of core particles is further treated with a second mixture of a monomer or monomers to form a surface layer on the core particles and wherein the second mixture of monomer or monomers reacts with the inert core and secondly forms a polymer capable of forming free radicals.

For example, in the dispersion polymerisation of saturated polyester elastomer particles from adipic acid, glycerol and diethylene glycol in which the co-reactants are drip-fed into petroleum ether containing an appropriate surfactant and having suspended in it the finely divided iron oxide or titanium oxide, ethylenic unsaturation may be introduced into surface regions of the particle by the addition of itaconic acid in the latter stages of the feed.

Similarly elastomeric particles from addition polymers, for example, polyethyl acrylate crosslinked with a small amount of ethylene glycol dimethacrylate, may be modified by adding glycidyl methacrylate during the last stages of the feed in the dispersion polymerisation of ethyl acrylate in petroleum ether. The epoxide group of the glycidyl methacrylate can then be reacted with, for example, hydroxyethyl methacrylate to provide unsaturation in the surface regions of the particles.

Alternatively, it may be the hydroxyethyl methacrylate or t-butyl-aminoethyl methacrylate that is incorporated in the surface of the bead and the glycidyl methacrylate which is added to provide surface unsaturation.

Polyurethane particles may be prepared from polyethylene glycol or hyroxyl-terminated ethylene glycol adipate polyester and a suitable diisocyanate and adding a triol such as glycerol or trimethylolpropane as the crosslinking agent. Surface modification may be achieved by the delayed addition of a suitable unsaturated diol such as trimethylolpropane monomethacrylate or other reactive diol.

Other groups can be similarly incorporated into the surface to give active sites for free radical initiated grafting of addition polymers onto the particles.

As before, delayed addition of the appropriate compound is used to confine the active sites to the surface regions of the particle. For example, mercapto groups may be formed in the surface of the particles by reacting hydrogen sulphide with the epoxide group of glycidyl methacrylate.

In certain cases, the heterogeneous elastomeric particles of our invention may be used as reinforcement of a polymer matrix without further modification. However, since there must be a strong adhesive bond between the heterogeneous elastomer particles and the matrix in which they are embedded, the particles are usually further treated to give a covalently bonded surface polymer to obtain particles with suitable surface properties.

The heterogeneous elastomeric particles of our invention, comprising an inert core and a surface layer containing groups capable of taking part in free radical addition polymerisations, may be surface modified by grafting addition polymers onto the particles via these reactive sites. Known means of initiating free radical polymerisation such as chemical initiators such as, for example, benzoyl peroxide, ammonium persulphate and azodiisobutyronitrile, heat, or radiation may be used. Suitable radiation has a wavelength of less than 100 Angstrom, in particular gamma- and beta- rays derived from isotopes or in the form of fast electrons such as produced by a Van de Graaff generator and an electron accelerator. Other sources of ionising or high energy radiation are known in the art, e.g. from British Pat. No. 801,528, page 1, lines 49–56; these include neutrons, accelerated heavy particles and X-rays or mixtures of them. A convenient practical source of high energy radiation is a Cobalt 60 source.

The dose rate of irradiation controls the rate of initiation of the polymerisation, but has little effect on the properties of the polymer formed. Dose rates between 10 rads/hr and 5 megarads/hr are operative and rates between 20,000 rads/hr and 1 megarad/hr are convenient in practice.

The choice of a surface polymer to meet the adhesive requirements may be guided by a consideration of the solubility parameters of the surface and matrix polymers. For example, chain entanglement is possible if the surface and matrix polymers are compatible. As a general rule, polymers are compatible if the mid-points of their solubility parameter ranges agree within one unit. If the surface and film-forming polymers are essentially incompatible, then sufficient adhesive forces may be generated by having strongly interacting groups in both the surface and matrix polymers. For example carboxyl/amine or carboxyl/hydroxyl or nitrile/nitrile groups may be used. In some cases it may be possible to obtain a strong bond between the surface polymer and a matrix polymer by having correctable groups in the respective polymers. For example, the surface polymer may contain hydroxyl groups and the matrix polymer may contain epoxide groups or vice versa. As further examples, the polymers may contain the following co-reactable groups: epoxide-carboxyl; carboxyl-hydroxyl; hydroxylisocyanate; isocyanate-primary or secondary amine.

As a further guide to the suitability of the surface polymer, the final composite material may be tested by breaking the composite and microscopically examining the fractured surface. If the dispersed elastomeric particles are fractured, then the bond between the surface polymer and matrix polymer is adequate. If a large percentage of elastomeric beads are pulled out of the matrix leaving complementary recesses, then the physical properties of the composite can be improved with the choice of a more suitable polymer using the criteria outlined above.

The surface modified particles are embedded in the polymer matrix by known means, bearing in mind that the completely fabricated polymer may be in the form of, for example, a sheet, moulding or surface coating film. The particles are typically 0.01 – 10 micron diameter, but where the particles are to be used in paint films, particles of 0.1 – 1 micron are preferred. In general, the maximum diameter will be determined by the thickness of the solid film laid down from the compositions and usually will not be greater than one tenth of this thickness. Where the particles are to be used in moulding applications particles of much greater diameters can be utilized.

The surface modified particles may be used in plastic mouldings, extrusions, films, fibers, or in paint films. In all cases, it is advantageous for the particles to be well dispersed in the final composite material. This should be considered when choosing a procedure for incorporating the particles into the matrix polymer. If the particles are to be used in bulk plastics, it may be convenient to add the surface modified particles in the form of a dry powder. If, on drying, the particles irreversibly coalesce, it is necessary to add the particles in the form of a slurry to the matrix polymer and the evaporate off the continuous liquid phase of the slurry.

In general, since the modifying surface polymer usually has a Tg above room temperature, the tendency of the particles to irreversibly coalesce is dependent on the amount of polymer grafted onto the particles. Increased levels of grafting should result in a decreased tendency to irreversibly coalesce.

Similar considerations apply to the use of the particles in paints. However, in this case it is usually easier than for incorporation into plastics, since the particles may be added to the paint in the form of a liquid dispersion.

In non-plasticized compositions the elastomer particles may be present in a proportion of from 5 – 70% by volume of the matrix polymer. When plasticiser is present, the lower proportions of elastomer particles may be used, but from 20 – 50% by volume is a more usual proportion. Where the higher proportions of 50 – 70% by volume are required, this can be achieved by using a mixture of sizes of elastomer particles in order to increase the degree of packing.

The invention may be applied to coating compositions in which the major film-forming material is e.g. an alkyd resin, an epoxy resin, a cellulose derivative, a linear condensation polymer such as polyamide or polyester, a vinyl resin such as polystyrene or polyvinyl chloride, or an acrylic resin such as polymethyl methacrylate. The film-forming material also may comprise a monomeric or oligomeric material which is polymerised or cured on the substrate being coated to form the solid film, such as low molecular weight amine formaldehyde, phenol formaldehyde, epoxy and polyester condensates. The film-forming material may be present in the coating composition partly or wholly in monomeric form and the liquid continuous phase may be provided by a liquid monomer optionally containing another film-forming component in solution.

The liquid phase may comprise an appropriate volatile liquid which may be evaporated on use of the composition, the liquid containing a solid or liqud film-forming material dissolved or dispersed therein. Alternatively, the liquid may be a crosslinkable or polymerisable liquid which may itself provide some or all of the film-forming material of the composition.

The invention is particularly useful when applied to coating compositions in which the film-forming material is to be crosslinked on the coated surface. The objective of crosslinking is to produce hard, durable films and the tendency of such films to be particularly brittle can effectively be modified by the incorporation of rubbery particles as described above.

A further advantage of using elastomeric beads containing pigment is that the beads act as a pigment and therefore if it is desired to pigment the final product containing the elastomeric beads, less pigment need be added to the continuous matrix.

This is advantageous in that addition of large amounts of pigment to the matrix containing the beads can lead to a deterioration in its physical properties.

The invention is now illustrated by, but by no means limited to, the following examples in which all parts are parts by weight unless otherwise stated.

EXAMPLE 1

An initial mixture of petroleum ether b.p. 180° – 210° (270 parts), adipic acid (122.3 parts) and graft copolymer emulsifying agent solution (42.6 parts) was placed in a 2 litre flange flask fitted with an anchor stirrer, a Dean-Stark trap, condenser, nitrogen inlet and a steam-jacketed dropping funnel. The graft copolymer emulsifying agent was a free-radical copolymerisation product of the glycidyl methacrylate ester of the self polyester of 12-hydroxy stearic acid, methyl methacrylate and methacrylic acid. The emulsifying agent solution was a 64 percent solids solution of this copolymer in butyl acetate.

The mixture was heated to reflux under a nitrogen atmosphere with rapid stirring. When reflux just commenced a second intimate mixture of adipic acid (8.0 parts) and Austiox R-CR3 (Trade Mark for titanium dioxide surface coated with triethanolamine, 8.0 parts) was added, and the resultant mixture was maintained at reflux for 20 minutes before further feed addition.

A hot mixture of trimethylolpropane (56.0 parts) triethyleneglycol (55.4 parts) and water (90.0 parts) was then added over 15 minutes, and the mixture refluxed for 20 minutes. A hot mixture of oxalic acid (1.6 parts), itaconic acid (17.6 parts), triethylene glycol (9.8 parts), trimethylolpropane (8.6 parts), 'Topanol A' (0.2 parts), methanol (30.0 parts) and water (20.0 parts) was added over 10 minutes to the refluxing mixture. A mixture of p-toluene-sulphonic acid (1.0 parts) with water (10.0 parts) was added over 2 minutes.

The mixture was heated under reflux for a further 3 hours. A dispersion of elastomeric particles was obtained containing 3% w/w pigment, and having a particle size range of 1 – 5 microns. Topanol A is a trade mark for 2,4-dimethyl-6-t-butylphenol.

EXAMPLE 2

Example 1 was repeated with the following changes. The initial mixture contained petroleum ether b.p. 180° – 210° (275.0 parts), adipic adic (113.0 parts) as well as the graft copolymer emulsifying agent, and the second mixture contained Austiox R-CR3 (17.3 parts) and adipic acid (17.3 parts). The elastomeric particles contained 6% w/w pigments, and had a particle size of 0.5 – 3.0 microns.

EXAMPLE 3

Example 1 was repeated with the following changes. The initial mixture contained petroleum ether b.p. 180°– 210° (290 parts), adipic acid (100.3 parts) as well as the graft copolymer emulsifying agent, and the second mixture contained Austiox R-CR3 (30.0 parts) and adipic acid (30.0 parts). This gave beads containing 10% w/w pigment and having a particle size of 0.5 – 5.0 microns (Tg = –58°C by differential scanning calorimeter (d.s.c.) ).

EXAMPLE 4

Example 1 was repeated with the following changes. The initial mixture contained petroleum ether b.p. 180°– 210° (375 parts), adipic acid (82.3 parts) as well as the graft copolymer emulsifying agent, and the second mixture contained Austiox R-CR3 (48.0 parts) and adipic acid (48.0 parts). The elastomeric beads contained 15% w/w pigment and had a particle size rang 0.5 – 6.0 microns (45% solids).

EXAMPLE 5

Example 1 was repeated with the following changes. The initial mixture contained petroleum ether b.p. 180°– 210° (400 parts), adipic acid (62.3 parts) as well as the graft copolymer emulsifying agent, and the second mixture contained Austiox R-CR3 (68.0 parts) and adipic acid (68.0 parts). The elastomeric beads contained 20% w/w pigment, and had a particle size range 0.5 – 5.0 microns (45% solids).

EXAMPLE 6

Example 1 was repeated with the following changes. The initial mixture contained petroleum ether b.p. 180°– 210° (425 parts), adipic acid (60.3 parts) as well as the graft copolymer emulsifying agent, and the second mixture contained Austiox R-CR3 (90.0 parts) and adipic acid (70.0 parts). This gave beads with 25% w/w pigment, and having a particle size of 0.5 – 7.0 microns (45% solids).

EXAMPLE 7

This example demonstrates the radiation initiated grafting of a layer of polymer compatible with the matrix onto the pigment elastomer beads. A mixture of a 50% solids dispersion (80.0 parts) of the elastomeric particles prepared in Example 1, petroleum ether b.p. 40° – 60° (260 parts), and methyl methacrylate (60.0 parts) was irradiated by means of a Cobalt 60 souce. The dose rate was 0.3 Mrad/hour, and the mixture was irradiated for 2½ hours with stirring. After irradiation, ethoxyethyl acetate (200 parts) was added and the petroleum ether removed to yield a creamy dispersion of the grafted beads. (Solids approx. 30%).

EXAMPLE 8

Example 7 was repeated except that the 50% solids dispersion of particles prepared in Example 1 was replaced with the 50% dispersion of particles prepared in Example 2.

EXAMPLE 9

Example 7 was repeated except that the 50% solids dispersion of particles prepared in Example 1 was replaced with the 50% dispersion of particles prepared in Example 3.

EXAMPLE 10

Example 7 was repeated except that the 50% solids dispersion of particles prepared in Example 1 was replaced with the 45% solids dispersion of particles prepared in Example 4 (89.0 parts).

EXAMPLE 11

Example 10 was repeated except that the 45% solids dispersion of particles prepared in Example 4 was replaced with the 45% solids dispersion of particles prepared in Example 5.

EXAMPLE 12

Example 10 was repeated except that the 45% solids dispersion of particles prepared in Example 4 was replaced with the 45% solids dispersion of particles prepared in Example 6.

EXAMPLE 13

Example 7 was repeated except that the titanium oxide used in the preparation of the beads by the method of Example 1 was omitted. Particles in the size range 0.5 to 5.0 microns were obtained, (Tg = –55°C by d.s.c.).

EXAMPLE 14

Example 3 was repeated replacing the titanium oxide with iron oxide, pigment grade (30.0 parts). The pigmented elastomeric particles had a particle size of 0.5 – 5 microns.

EXAMPLE 15

Example 1 was repeated replacing the titanium oxide with carbon black (carboxylic acid surface) (8.0 parts). The final particle size was 1 – 5 microns.

EXAMPLE 16

Example 1 was repeated replacing the titanium oxide with copper phthalocyanine blue (8.0 parts). The final particle size was 1 – 7 microns.

EXAMPLE 17

Example 7 was repeated except that the 50% solids dispersion of particles prepared in Example 1 was replaced with the 50% solids dispersion of particles prepared in Example 14.

EXAMPLE 18

Example 7 was repeated except that the 50% solids dispersion of particles prepared in Example 1 was replaced with the 50% solids dispersion of particles prepared in Example 15. This dispersion of grafted beads on testing as described in Example 20 had slightly inferior results compared with the standard polymethyl methacrylate.

EXAMPLE 19

Example 7 was repeated except that the 50% solids dispersion of particles prepared in Example 1 was replaced with the 50% solids dispersion of particles prepared in Example 16. This dispersion also showed inferior results on testing as described in Example 20.

EXAMPLE 20

This Example illustrates the use of grafted elastomers incorporated into an acrylic matrix whose major component is the same as, or similar to, that grafted on to the particle.

Test samples were prepared by adding the ethoxyethyl acetate dispersion of each of the samples of grafted particles prepared in Examples 7 – 13 and 17 – 19 to the acrylic matrix in the required concentrations, then making the samples up to the same solids content with solvent. Glass panels (20 cm × 10 cm) were coated with 2.5% aqueous "Methocel" (Methocel is a Trade Mark for methyl cellulose, 15 cps), then baked for 1 hour at 150°C. The test films were drawn down with a 250 micron blade, air-dried for 15 minutes, then baked for 30 minutes at 130°C. The test films were removed from the glass panels by soaking them in water for 10 minutes. Test strips (5cm × 2 cm) were cut from the sheet, without edge flaws using a warm scalpel blade, and the resulting strips tested on an Instron Tensile Tester.

The following table illustrates the advantages produced by the introduction of the grafted surface-modified particles.

izable compound, said surface layer having a glass transition temperature above room temperature and being capable of forming free radicals and being covalently bonded to the elastomeric core, the elastomeric core containing finely divided particles chosen from the group consisting of titanium oxides and iron oxides wherein the finely divided particles are in the size range of 0.01 to 1 micron and the proportion of finely divided particles in the elastomeric core is in the range of 0.1 to 50% W/W and being substantially inert such that the core will not readily generate free radicals under the conditions in which the surface layer readily forms free radicals and will absorb less solvent than 150% w/w of the core.

2. A heterogeneous elastomeric particle according to claim 1 wherein the finely divided particles are in the size range from 0.05 to 0.5 microns.

3. A heterogeneous elastomeric particle according to claim 1 wherein the proportion of finely divided particles in the elastomeric core is in the range from 1% to 30% w/w.

4. A heterogeneous elastomeric particle according to claim 1 wherein the inert elastomeric core is capable of absorbing less than 150% by weight of solvent per weight of the core at ambient temperatures.

5. A heterogeneous elastomeric particle according to claim 4 wherein the inert elastomeric core is capable of absorbing less than 75% by weight of solvent per weight of the core at ambient temperatures.

6. A heterogeneous elastomeric particle according to claim 1 wherein the inert core is chosen from the group consisting of polyesters, polyurethanes, polyamides, epoxy elastomeric polymers, crosslinked polyacrylates and crosslinked polymethacrylates.

7. A heterogeneous elastomeric particle according to claim 6 wherein the inert core is a polyester of adipic acid, glycerol and a glycol wherein the molar ratio of glycerol to adipic acid is in the range from 66:100 to 24:100.

8. A heterogeneous elastomeric particle for reinforcing a matrix polymer which particle comprises a heter-

| Example number in which grafted beads were prepared | Matrix System | Grafted beads (percentage) | BBP* Plasticizer percentage) | Hardness (knoop) | Yield Strength (Kg cm$^{-6}$) | | Elongation (percent) | |
|---|---|---|---|---|---|---|---|---|
| | | | | | 20°C | 30°C | 20°C | 30°C |
| — | Unpigmented polymethyl methacrylate in 70/30 toluene/ acetone (40% solids) | 0 | 0 | 22.0 | 375 | 340 | 5.0 | 12.0 |
| | " | 0 | 20 | 9.8 | 170 | 145 | 11.0 | 20.0 |
| 7 | " | 30 | 0 | 14.0 | 330 | 280 | 11.0 | 20.0 |
| 7 | " | 30 | 12 | 9.9 | 310 | 255 | 23.0 | 50.0 |
| 7 | " | 30 | 20 | 5.3 | 145 | 135 | 36.0 | 60.0 |
| 9 | " | 30 | 0 | 15.0 | 400 | 360 | 8.5 | 10.0 |
| 9 | " | 30 | 12 | 9.6 | 380 | 345 | 18.0 | 27.0 |
| 9 | " | 30 | 20 | 6.7 | 200 | 175 | 25.0 | 60.0 |
| 13 | " | 30 | 20 | 7.0 | 125 | 95 | 17.0 | 25.0 |
| 17 | " | 30 | 20 | 9.0 | 210 | 200 | 13.0 | 25.0 |

*BBP = Butyl benzyl phthalate

We claim:

1. A heterogeneous elastomeric particle comprising an elastomeric core whose primary glass transition temperature is below the lowest temperature to which the polymeric composition is likely to be subjected surrounded by a surface layer formed from a polymerogeneous elastomeric particle according to claim 1 wherein said surface layer of said particle is a polymer which is compatible with the matrix polymer.

9. A polymeric article comprising the heterogeneous elastomeric particles of claim 1 embedded in a matrix polymer.

10. A polymeric article according to claim 9 wherein the matrix polymer is covalently bonded to the surface layer of the heterogeneous elastomeric particles.

11. A coating composition comprising elastomeric particles according to claim 1, a film forming material and a liquid continuous phase wherein the elastomeric particles are dispersed in the liquid continuous phase.

12. A coating composition according to claim 11 wherein the size of the elastomeric particles is in the range from 0.1 to 1 micron.

* * * * *